July 1, 1958 W. F. BERCK 2,841,359
SHUT-OFF VALVE

Filed Sept. 18, 1956 2 Sheets-Sheet 1

INVENTOR.
WILLIAM F. BERCK
BY
Mellin and Hanscom
ATTORNEYS

July 1, 1958 W. F. BERCK 2,841,359
SHUT-OFF VALVE
Filed Sept. 18, 1956 2 Sheets-Sheet 2
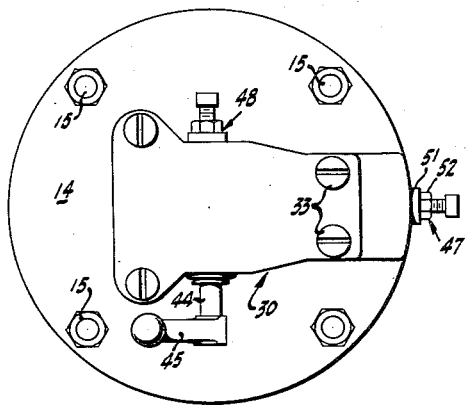
INVENTOR.
WILLIAM F. BERCK
BY
Mellin and Hanscom
ATTORNEYS United States Patent Office 2,841,359
Patented July 1, 1958

2,841,359

SHUT-OFF VALVE

William F. Berck, Hayward, Calif., assignor to Ralph N. Brodie Company, San Leandro, Calif., a corporation of California Application September 18, 1956, Serial No. 610,535

2 Claims. (Cl. 251—25)

This invention relates to a shut-off valve, and particularly to a valve of the type wherein a piston is moved to and from a closed position by fluid pressure of a medium flowing to and through the valve.

The present invention is directed to a shut-off valve of the general character disclosed in my copending application, Serial No. 324,501, filed December 6, 1952, now Patent No. 2,781,997 of February 19, 1957; and comprises new and improved features of construction, assembly and operation, improving the operation and broadening the field of utility of the valve.

It is among the objects of this invention to provide a shut-off valve having a piston movable to and from its closed position by fluid pressures directed onto the piston from within the body of the valve, said fluid pressures in turn being controlled by a control valve mounted in association with the piston, and operable to cause desired movement of the piston.

It is also an object of this invention to provide a main valve and piston seated within a valve body and provided with sealing means effectively preventing leakage through or from the valve, even under high pressure conditions.

Another object is to provide a valve of the character described which requires no delicate parts or external tubing, and which may be controlled manually or by remote control with a minimum of effort or power.

A further object is to provide a valve in which the opening and closing of the valve is effected by a piston actuated by fluid pressures from within the valve, and which is moved to closed and open positions by causing the piston to be balanced against the pressure prevailing in the inlet and outlet ends of the valve respectively.

It is also an object to control the flow of fluid pressure to and from the main valve piston to eliminate line shocks and "water hammer" as the valve is opened or closed.

A still further object is to provide a valve of the character described wherein the main valve and the control valve, along with all the associated parts thereof, are constructed as a unitary assembly mountable as a unit extending onto the main valve body through a side wall portion thereof, the assembly being bodily removable from the valve body for repair or replacement.

Further objects include the provision of improved features of construction, arrangement and operation facilitating the manufacture, installation, maintenance and repair of the valve.

These and other objects, some of which will be more fully explained hereinafter, are accomplished by the device shown in the drawings annexed hereto and forming a part of the present specification. The invention, of course, is not limited to the single embodiment selected for illustration in the drawings, as the details may be varied widely and the invention may be otherwise embodied within the scope of the appended claims.

In the drawings:

Fig. 2 is a similar view, the parts being shown in valve opening position; and

Fig. 3 is a plan view of the control valve assembly.

Figure 1:
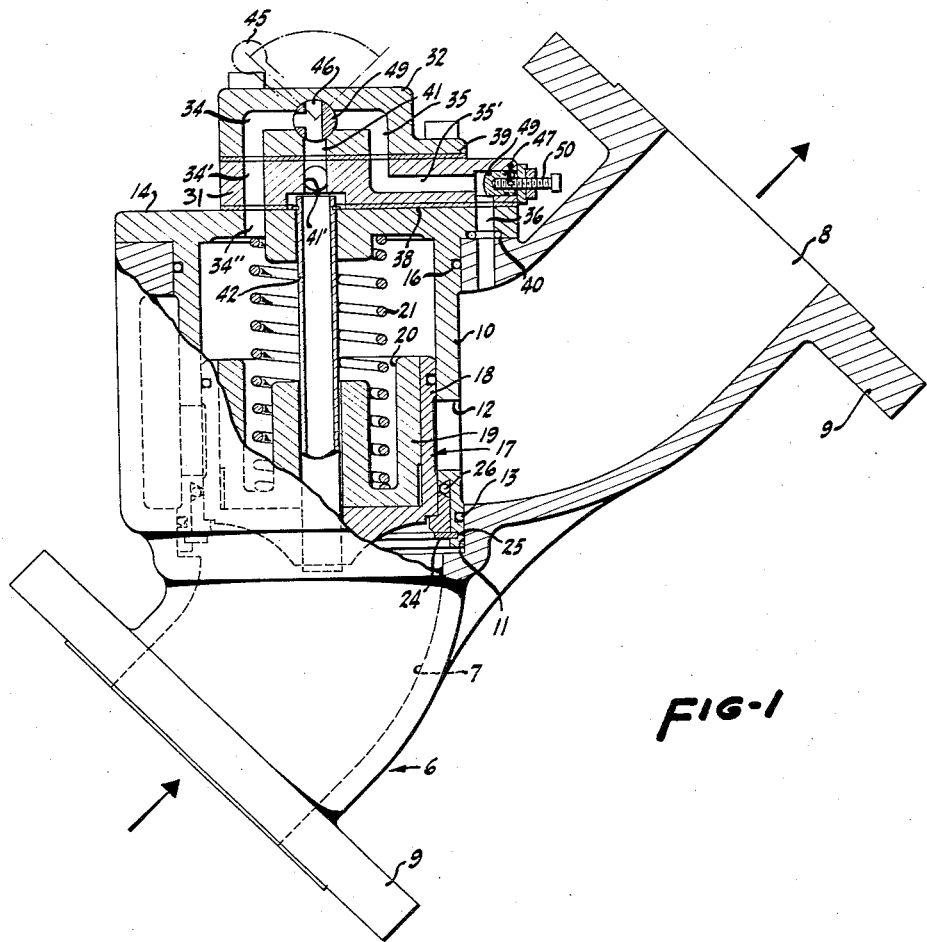
Fig. 1 is a side elevational view of a shut-off valve embodying the invention, parts being broken away and shown in vertical mid-section, the moving parts being shown in valve closing position.

In terms of broad inclusion, the shut-off valve of the present invention comprises a valve body divided to provide inlet and outlet chambers arranged to be connected to inflow and outflow pipe connections. Flow from the inlet to the outlet chamber is controlled by a piston movable within a cylinder, which is seated within the body to communicate with the inlet chamber through an open inner end and with the outlet chamber through ports in the cylinder wall. The piston is normally spring-urged to its closed position, and is arranged to be moved to and from its closed position in response to fluid pressure applied to the piston from within the valve body. The cylinder is provided with a central head assembly including a two-way valve operable to selectively subject the inner end of the piston to the inflowing pressure or the outflowing pressure. When the pressure of the inlet chamber is directed into the closed end of the cylinder, the fluid pressure on opposite sides of the piston is balanced, and the piston is held seated in closed position by the spring. When the control valve is turned to place the closed end of the cylinder in communication with the outlet chamber, the fluid pressure is unbalanced, and the piston is moved to uncover the ports opening into the outlet chamber. The amount of movement of the piston depends upon the difference in pressure prevailing in the inlet and outlet chambers. The invention further contemplates the provision of means for restricting the flow of fluid to and from the valve cylinder to prevent shock or "water hammer" when the valve is suddenly opened or closed. Also, the invention contemplates a structure in which the main valve and the control mechanism is assembled as a unit removable bodily from the valve body for repair or replacement.

In terms of greater detail, the shut-off valve of this invention comprises a valve body, designated in general by the numeral 6, provided with an inlet chamber 7, and an outlet chamber 8 arranged to be connected to inflowing and outflowing pipe connections (not shown). Such connection may be effected by flanges 9, as illustrated in the drawings, or by threaded connections, or by any other desired connecting means.

A valve cylinder 10 is mounted to extend through a wall portion of the body 6 into engagement with a seat 11 formed within the body. The inner end of the cylinder 10 is open, and communicates directly with the inlet chamber 7; and one or more ports 12 are formed in the cylinder wall to communicate with the outlet chamber 1. As illustrated, a plurality of angularly spaced ports 12 are provided. The size and number of ports, of course, may be varied to provide a desired flow capacity. An O-ring 13, or other suitable packing means, is provided to seal the inner end of the cylinder within the seat 11, and to prevent leakage of fluid from the inlet to the outlet chamber.

At its outer end, the cylinder 10 is provided with a flanged head 14 seating against the body 6 to which it is secured by bolts 15 or other suitable securing means. An O-ring 16, or other suitable packing means, provides a seal between the cylinder and the valve body to prevent leakage from the body past the outer end of the cylinder.

A piston, designated in general by the numeral 17, is mounted within the cylinder 10. The piston preferably comprises an outer shell having a skirt portion 18 sized to obtain a neat sliding fit within the cylinder. A core 19 is fitted within the piston, the core having an annular recess 20 to receive a coil spring 21 compressed between the piston and the closed end of the cylinder. The spring 21 normally urges the piston toward its closed position with its outer peripheral edge seating upon an internal shoulder 22 formed upon a retaining ring 23. A snap ring 24, engaging a groove 25 within the open end of the cylinder 10, holds the ring 23 in position to serve both as a stop for the piston and as a retainer for an O-ring 26 seated at the back of a recess 27 within which the ring 23 fits. The O-ring 26 provides a seal between the piston skirt of the cylinder at a point spaced in one direction from the ports 12. Another O-ring 28 is fitted into a groove 29 formed near the inner end of the skirt 18 to effect sealing engagement with the cylinder at a point spaced from the ports 12 in the opposite direction.

Upon the outer face of the flanged head of the cylinder 10 is mounted a control valve head assembly, designated in general by the numeral 30. As illustrated, the valve head assembly 30 comprises an adaptor plate 31 and a cover plate 32, secured to the flange top of the cylinder by cap screws 33 or equivalent securing means. A passage 34, formed in the cover plate, registers with matching passage portion 34' and 34'' in the adaptor plate 31 and the head 14 of the cylinder 10, respectively, to communicate with the space within the cylinder between the piston and the closed end of the cylinder. Another passage 35 registers with a passage 35' in the adaptor plate. The passage 35' in turn registers with matching passages 36 and 37 in the cylinder flange 14 and the adjacent wall portion of the body 10 to provide communication with the outlet chamber 8. Gaskets 38 and 39 are provided between the adaptor plate and the adjacent surfaces of the cylinder head and cover plate, and an O-ring 40 is provided to seal the juncture of the passages 36 and 37.

An input passage 41 in the cover plate 32 registers with a corresponding passage 41' in the adaptor plate 31 to form a passage communicating with a pressure supply tube 42, which extends axially through the piston and cylinder. At its upper end (in the position illustrated) the tube is secured to the cylinder head by a snap ring 43 engaging an annular groove in the tube, and seating upon the cylinder head. The tube is held against upward vertical movement through the cylinder head by the adaptor plate 31. The lower end of the tube 42 opens into the inlet chamber 7 through the piston 17, which is slidably movable therealong between its open and closed positions.

Within the cover plate 32 is mounted a two-way valve, designated in general by the numeral 44. For the purpose of illustration, the valve 44 is shown as a valve of the plug cock type arranged to be actuated manually by a lever handle 45 movable between the open and closed positions indicated in broken lines in Fig. 2 and Fig. 1, respectively. Any other type of two-way valve may be substituted, and the valve may be actuated by a solenoid, by hydraulic or pneumatic pressure, or by other conventional means, for applying actuating power directly or by remote control. The plug includes a T-shaped passage 46 movable to connect the passage 34 to the input passage 41, as illustrated in Fig. 1 of the drawings, or to the passages 35—36—37 communicating with the outlet chamber 8, as indicated in Fig. 2. In the latter position, the input passage 41 is closed, and communication is established through the head assembly between the cylinder and the outlet chamber.

Preferably, flow restricting valves 47 and 48 are mounted in association with the passages 35' and 41'. The valves may be of any conventional type, as, for example, plugs 49 slidably sealed in passages bored through the wall portions of the adaptor plate 31 to intersect the passages 35' and 41', as indicated. The plugs are pinned or otherwise secured to stems 50 threaded through a nut 51 secured to the outer face of the adaptor plate and locked in adjustment by a lock nut 52.

In operation, the valve is assembled as shown and described with the inlet chamber 7 connected to an inflow pipe connection and the outlet chamber 8 connected to an outflow pipe connection of a fluid supply system in which fluid is supplied at a pressure materially higher than that at which it is delivered to the outflow connection. When the control valve 44 is in the position shown in Fig. 1, fluid pressure from the inlet chamber 7 is directed through the tube 42 and input passages 41—41' to the passages 34—34'—34'', which open into the cylinder 10 above the piston 17. This causes the pressure against the exposed face of the piston to be balanced by the same pressure as it is directed into the cylinder in back of the piston. As a result, the piston will not be affected by the inflowing fluid pressure, and will remain seated under the pressure exerted by the spring 21.

When it is desired to open the valve, the control valve 44 is turned to the position shown in Fig. 2. This causes the inflowing pressure to be shut off at the input passage 41, and at the same time causes the pressure prevailing in the cylinder, above the piston 17, to be released into the outlet chamber. The release of this pressure unbalances the pressures on opposite sides of the piston, and the piston is immediately displaced inwardly against the resistance of the spring 21 by the pressure prevailing in the inlet chamber. This inward displacement of the piston causes the ports 12 to be uncovered, thereby permitting the flow of fluid through the inner end of the cylinder from the inlet chamber to the outlet chamber.

The amount of displacement of the piston depends upon the pressure differential prevailing upon the supply and delivery sides of the valve; for example, in a conventional installation a differential of four pounds per square inch may cause the piston to fully uncover the ports 12. If the differential is less, the opening of the ports will be less, and the flow of fluid through the valve also will be correspondingly less.

Under high inflow pressures, manual operation of shut-off valves of conventional type may be very difficult, if not impossible. Mechanical or electrical operation of such valves involves costly equipment and skilled maintenance. The device of the present invention balances the inflowing pressure upon opposite sides of the valve piston, so that only the pressure of the spring is applied to normally keep the valve closed. When the space above the piston is connected to the low pressure side of the valve body, the piston is caused to be unseated by the incoming fluid pressure, with little actuating effort by the operator or control valve operating means.

Since sudden opening or closing of the valve, particularly under high pressures, may cause a severe line shock or "water hammer," one or both of the valves 47 and 48 may be adjusted to sufficiently restrict the flow of fluid through the corresponding passages 36 and 41' to cause a gradual movement of the piston to and from its closed position. This effectually eliminates line shock and "water hammer" and insures a smooth and efficient operation.

Having thus described my invention, what I claim and desire to secure by Letters Patent is:

1. A shut-off valve comprising a valve body having inlet and outlet chambers arranged to be connected to inflow and outflow pipe connections, a valve cylinder having an open inner end seated in sealed position within the body in communication with the inlet chamber and provided with ports through the wall portion of the cylinder communicating with the outlet chamber, a piston slidably mounted within the cylinder for movement to and from a port closing position, spring means normally urging the piston to its port closing position, an O-ring carried by the piston in sealing engagement with the cylinder inwardly from the ports, a retaining ring removably secured within the open end of the cylinder, an O-ring seated within the cylinder between its open end and the ports and retained in sealing engagement with the piston wall by the retaining ring, a control valve head assembly carried by the cylinder in sealingly seated position upon an outer wall portion of the body, a two-way control valve operably mounted within the head assembly, passages in the head interconnectable through the control valve for selectively connecting the space within the cylinder above the piston with the inlet chamber or the outlet chamber.

2. A shut-off valve as defined by claim 1 provided with adjustable means for regulating the flow of fluid pressure to and from the cylinder for varying the rate of movement of the piston to and from its port closing position.

References Cited in the file of this patent

UNITED STATES PATENTS

| | | |
|---|---|---|
| 890,550 | Anderson | June 9, 1908 |
| 2,117,096 | Klawitter | May 10, 1938 |

FOREIGN PATENTS

| | | |
|---|---|---|
| 339,086 | France | Oct. 31, 1904 |